Figure 1:
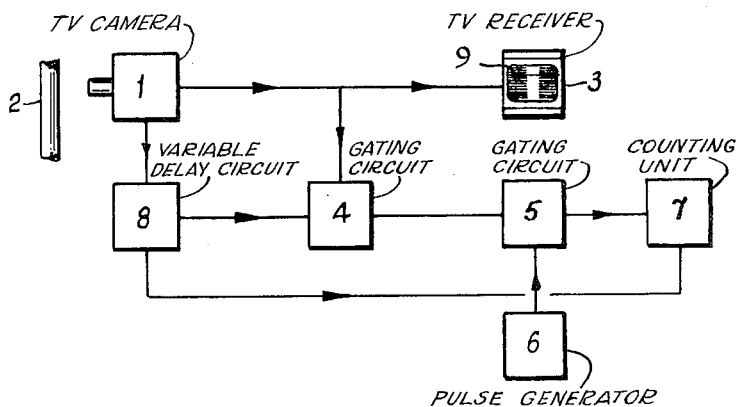

Nov. 16, 1965  W. C. REED  3,218,389
METHOD FOR THE RAPID, CONTINUOUS AND ACCURATE DETERMINATION
OF THE SIZE OF STATIONARY AND MOVING OBJECTS
Filed July 13, 1962  2 Sheets-Sheet 1

Inventor
William C. Reed.

By
Howson and Howson
Attorneys

Nov. 16, 1965  W. C. REED  3,218,389
METHOD FOR THE RAPID, CONTINUOUS AND ACCURATE DETERMINATION
OF THE SIZE OF STATIONARY AND MOVING OBJECTS
Filed July 13, 1962  2 Sheets-Sheet 2

*Inventor*
William C. Reed.

By
Howson and Howson
*Attorneys*

United States Patent Office 3,218,389
Patented Nov. 16, 1965

3,218,389
METHOD FOR THE RAPID, CONTINUOUS AND ACCURATE DETERMINATION OF THE SIZE OF STATIONARY AND MOVING OBJECTS
William C. Reed, Whitley Bay, England, assignor to The Thermal Syndicate Limited, Wallsend, Northumberland, England, a British company
Filed July 13, 1962, Ser. No. 209,614
7 Claims. (Cl. 178—6)

This invention relates to a method of utilising a non-contacting standard television camera and receiving system to determine accurately a dimension of any stationary or moving object viewed by the camera.

The invention permits the accurate and continuous determination of a dimension of an object viewed by a television camera and display of the determined value.

According to the invention a method of determining a dimension of an object comprises viewing the object with a television camera, extracting one line of scan or one frame from the output signal of the television camera and feeding the signal responsible for the line or frame to a circuit wherein it is utilised to determine the dimension in the direction of scan, or at right angles thereto, of the object viewed by the camera.

Preferably the circuit comprises a counting device which may be a standard decimal binary arrangement with the count displayed digitally. If desired, the display may be calibrated directly in convenient mensural units.

In one embodiment of the invention, the dimension to be measured is arranged to be in the direction of the lines of scan and the counting device is adapted to count the number of radio frequency pulses of a particular amplitude or range of amplitudes occurring directly in one line of scan.

In a further embodiment of the invention, the counting device is adapted to count the pulses from a suitable generator, it being arranged that the output from the generator is only fed to the counting device for that proportion of the total time of one line of scan taken up in the scanning of the object.

In a still further embodiment of the invention the dimension to be measured is arranged to be at right angles to the lines of scan of the television camera and the number of lines of scan of the television camera energised by the object, counted.

It will be appreciated that this last mentioned embodiment of the invention is suitable only where the dimension of the object at right angles to the direction of scan is substantially constant across the entire field of view of the television camera.

Figure 2:
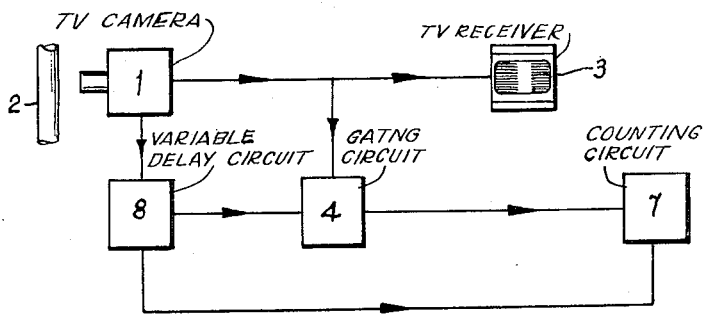
Figure 3:
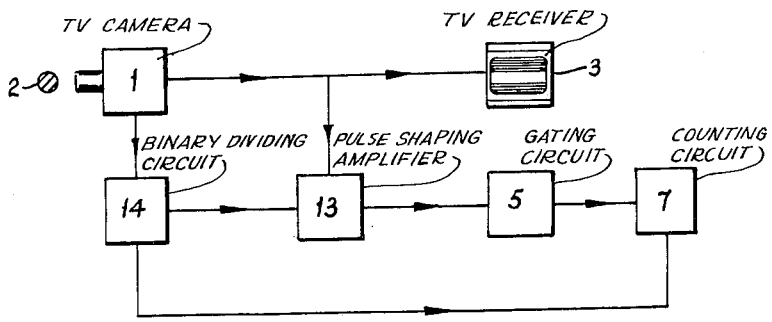

The method of the present invention will now be described by way of example with reference to the accompanying drawings, in which:

FIGURES 1, 2 and 3 are schematic block circuit diagrams of arrangements for carrying out three different embodiments of the invention, and FIGURES 4, 5, 6 and 7 are various signal trains appearing in the arrangement of FIGURE 1.

In each of the arrangements of FIGURES 1, 2 and 3, a television camera 1 is directed to view an object 2 (which will be assumed to be cylindrical). In each of these examples the object 2 is shown as extending axially beyond the field of view of the camera 1 though this need not always be the case. The output signal from the camera 1 is fed to a standard television receiver 3 where a picture of the scene viewed by the camera is displayed.

Figure 4:
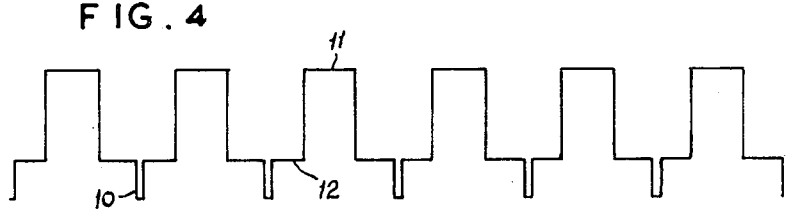

When the object 2 is placed before the camera 1, the camera scans both the background and the object within the limits of its vision. When the background is made virtually black and the object 2 uniformly illuminated, the output signal from the television camera is substantially as illustrated in FIGURE 4, the signal train being at two levels only (ignoring synchronising pulses 10), one level 11 of signal resulting from scanning the illuminated object and the other level 12 resulting from scanning the background. The camera circuit is adjusted so that the level 12 is at the standard black level (i.e. the 30 percent level) and the level 11 is at the standard white level (i.e. the 100 percent level).

Referring again to FIGURE 1, the object 2 is located so that the direction in which the object dimension is required is parallel to the direction of line scan of the camera 1. The output signal from the camera 1 is also fed to a gating circuit 4 which incorporates a pulse shaping amplifier. The gating circuit 4 is fed with line synchronising and frame synchronising pulses from the camera 1 via a variable delay circuit 8. The variable delay circuit 8 in the line synchronising pulse circuit, permits any one line of scan to be selected from the full frame. The frame synchronising pulse resets the gating circuit 4 (and indeed the whole system) so that the selected line synchronising pulse received thereafter opens the gate and the next closes it, in which state it remains until it is reset by the next frame synchronising pulse.

Figure 5:
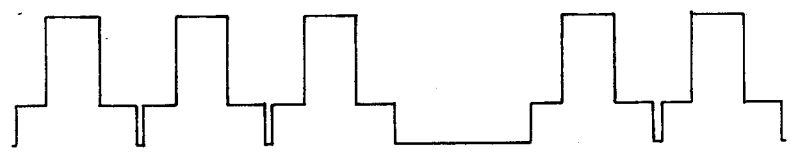
Figure 6:
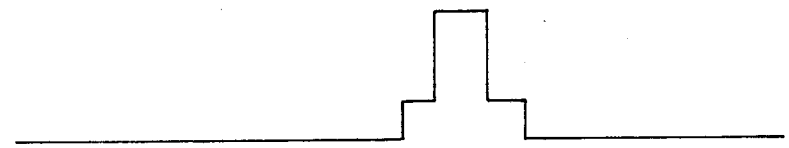
Figure 7:

The signal train fed to the receiver 3 may be as shown in FIGURE 5, the signal corresponding to one line of scan being suppressed so that a black line 9 appears on the television picture showing the actual position on the object at which the dimension is being determined. The gate is now open for a time equal to the time of one line of scan and the input signal to the gating circuit 4 from the camera 1 (FIGURE 6) is allowed to pass through the gating circuit 4 to a second gating circuit 5. The input signal causes the gating circuit 5 to open only when the signal is at the white signal level (i.e. 100 percent modulation). A continuous pulse train from a pulse generator 6 is also fed to gating circuit 5 and the output from this gating circuit (FIGURE 7) is fed to a counting unit 7. For that period of the single line scan time when the line signal is at the 100 percent modulation level and only for that period, the gating circuit 5 feeds the output of the pulse generator 6 to the counting circuit.

With the pulse generator 6 generating 10 megacycles per second and single line scan time of 100 microseconds (i.e. 405 lines and 25 frames per second), 1000 pulses are generated to represent the full width of the field of view of the camera. The distance between the object and the television camera is set so that the time interval between each pulse from the pulse generator represents a scan of 0.1 mm. This gives a full field of view of the camera of 100 mm. so that objects up to this size can be measured. Obviously the frequencies and line scan times can be varied to give any degree of accuracy required.

In the second arrangement shown in FIGURE 2, a single line of scan is extracted from the television camera 1 by the first gating circuit 4 as already described but is now fed direct to a counting circuit 7 which counts the R.F. pulses composing the signal. With an R.F. signal at 50 megacycles per second and a 405 line 25 frame frequency, 5000 R.F. pulses are generated in the 100 microseconds of each line of one full line of scan. In practice certain of these pulses are employed for line synchronisation but this fact has been ignored in this general explanation. 5000 R.F. pulses therefore represent one complete line of scan or the full width of the television camera field of view. With the object placed in the field of view of the camera, pulses are transmitted to the counting circuit for that period of one line of scan when the object is being scanned but no pulses are transmitted when the background is being scanned. If the object filled the whole field of view of the camera, 5000 pulses would be counted in each scan line and if no object was present no pulses would be counted. Clearly therefore the number of pulses actually counted in the single line of scan gives a determination of the dimension of the object in the direction of scan.

In practice the distance between the object 2 and the television camera 1 is adjusted so that each R.F. pulse represents a known dimension and in this example is such that each pulse corresponds to 0.02 mm. This gives a full field of view of the camera of 100 mm. so that objects up to this size can be measured in steps of 0.02 mm. Clearly the distance between the camera 1 and the object 2 can be varied so that within limits, any size of field can be obtained and any size of object measured.

In the third arrangement shown in FIGURE 3 the object 2 is disposed in a direction parallel to the lines of scan of the camera 1, i.e. the dimension to be measured is at right angles to the lines of scan. When the object 2 is illuminated as previously described, each frame output signal from the television camera comprises a number of lines of scan at the black level and a number of lines scan at the white level. The output signal from the camera 1 is fed both to the receiver 3 and to a pulse shaping amplifier 13 which in turn feeds a gating circuit 5. Frame synchronising pulses which occur at the start of each frame are also fed to the gating circuit 5 from an interlocking binary dividing circuit 14. The circuit 14 causes the gating circuit 5 to switch to its "open" position for a time equal to the duration of one frame. In this "open" condition the gating circuit 5 allows the input signal from the camera 1 to pass to a counting circuit 7. The switching signal from the binary dividing circuit 14 occurs once every 16 picture frames and hence the gating circuit is only "open" for one frame in every 16 frames. The frequency at which this occurs can of course be varied by increasing or decreasing the number of binary circuits in the unit. The signal output from the gating circuit 5 fed to the counter 7 comprises distinct pulses, each pulse representing one illuminated scan line of the television camera. The counting circuit 7 counts these pulses and displays the count on standard digital indicators (not shown). This total count per frame is now a measure of the number of scan lines illuminated by the object and therefore a measure of the size of the object.

Immediately prior to the gating circuit 5 being opened, the counting circuit 7 is reset to zero so that the count is not additive. With the binary dividing circuit 14 only opening the gating circuit for 1 period in 16, the final count is displayed for a time equivalent to 15 frames. As the frames occur 25 times per second a count is therefore made every 16/25 seconds.

In the above description no account has been taken of the "split frame" picture signal generally employed in television networks. The interlocking binary divider circuit is such however, that only alternate synchronising pulses are accepted and therefore full frames are used for counting. Two standard frames are generally used in closed circuit television networks namely 405 line and 625 line frames. These standard frames allow the object to be measured to an accuracy of 1/405 and 1/625 part (ignoring time taken for synchronising pulses), although any desired accuracy can be obtained by using non-standard frames.

With this invention rapid, continuous and accurate determination of the size of both stationary and moving objects can be made. The rapidity and accuracy depends upon the television camera picture, the frequency of the pulses fed to the counting circuit 7 and the optical distance of the camera 1 from the object 2.

The method can be applied where conditions make other forms of measurement difficult, e.g. in conditions of extreme heat or cold and in regions where there is a high radiation hazard.

The method of the invention is not confined to closed circuit television systems and the output from the television camera 1 could be transmitted to a receiver 3 and associated circuitry some distance away.

Measurement can be made at more than one point on the object by arranging gating circuits to feed more than one counting circuit. Comparison can therefore be made between two and more dimensions of the object. Any measurement made can be compared with a pre-set value and the resulting error signal utilised for control purposes.

So far, the implication has been that only visible light is employed, but clearly, infra-red and ultra-violet radiations can be utilised in the system if the mosaic of the television camera 1 is sensitive to these radiations.

What is claimed is:

1. The method of determining one dimension of stationary or moving objects comprising the steps causing a TV camera to observe the object from a predetermined distance with the scanning direction parallel to the dimension to be measured, obtaining an output signal from said camera providing an electrical representation of the field of view of the camera, said signal comprising a sequence of frames made up of a series of lines of scan formed from a train of electrical impulses, feeding the output signal to a TV receiver and converting said electrical representation into a visual representation of said field, selecting and extracting a single line of scan from said output signal representing the dimension to be measured on the object, and measuring electrically that portion of the extracted line on which the object is represented.

2. The method as claimed in claim 1 in which the measuring is carried out by counting the number of electrical impulses which form said portion of the extracted line.

3. A non-contacting method of accurately determining one dimension of stationary and moving objects according to claim 19, wherein the selected line of scan is first extracted from the output signal of the camera tube and only the remaining camera tube output signal is fed to the displaying receiver, whereby the two-dimensional visual representation of the field of view of the camera tube appears with a dark line where the dimension of the object is being determined.

4. The method as claimed in claim 1 wherein said measuring is carried out by feeding a signal representng said extracted line of scan to a gating circuit, feeding electrical impulses to said gating circuit, said pulses being passed by said gating circuit only while that portion of the extracted-line signal which represents the object is being fed, and counting electrically the number of pulses passed to measure said dimension.

5. A non-contacting method of accurately determining one dimension of stationary and moving objects according to claim 18, wherein the selected line of scan is first extracted from the output signal of the camera tube and only the remaining camera tube output signal is fed to the displaying receiver, whereby the two-dimensional visual representation of the field of view of the camera tube appears with a dark line where the dimension of the object is being determined.

6. The method as claimed in claim 1 wherein infra-red radiations from the object are observed and the signals obtained are in response to said radiations.

7. The method as claimed in claim 1 wherein ultra-violet radiations from the object are observed and the signals obtained in response to said radiations.

References Cited by the Examiner

UNITED STATES PATENTS

| | | | |
|---|---|---|---|
| 2,674,915 | 4/1954 | Anderson | 178—6 |
| 2,674,917 | 4/1954 | Ssumerhayes | 88—14 |
| 3,017,801 | 1/1962 | Ingber | 88—14 |

FOREIGN PATENTS 1,040,260  10/1958  Germany.

DAVID G. REDINBAUGH, *Primary Examiner.*

UNITED STATES PATENT OFFICE
CERTIFICATE OF CORRECTION

Patent No. 3,218,389　　　　　　　　　　　November 16, 1965

William C. Reed

It is hereby certified that error appears in the above numbered patent requiring correction and that the said Letters Patent should read as corrected below.

Column 4, line 34, for the claim reference numeral "19" read -- 2 --; line 51, for the claim reference numeral "18" read -- 1 --.

Signed and sealed this 16th day of August 1966.

(SEAL)
Attest:

ERNEST W. SWIDER　　　　　　　　　　　EDWARD J. BRENNER
Attesting Officer　　　　　　　　　　　Commissioner of Patents